W. Stephens,
Millstone Pick.

N° 68,394.    Patented Sep. 3, 1867.

Witnesses.
A. Marr
V. D. Stockbridge.

Inventor.
Wm. Stephens
per
Alexander Mason
Attys

United States Patent Office.

WILLIAM B. STEPHENS, OF STEPHENS' MILLS NEW YORK.

Letters Patent No. 68,394, dated September 3, 1867.

IMPROVED MILL-PICK.

*The Schedule referred to in these Letters Patent and making part of the same.*

TO ALL WHOM IT MAY CONCERN:

Be it known that I, WILLIAM STEPHENS, of Stephens' Mills, in the county of Steuben, and in the State of New York, have invented certain new and useful improvements in "Mill-Picks;" and do hereby declare that the following is a full, clear, and exact description thereof, reference being had to the accompanying drawings, and to the letters of reference marked thereon.

Figure 1:
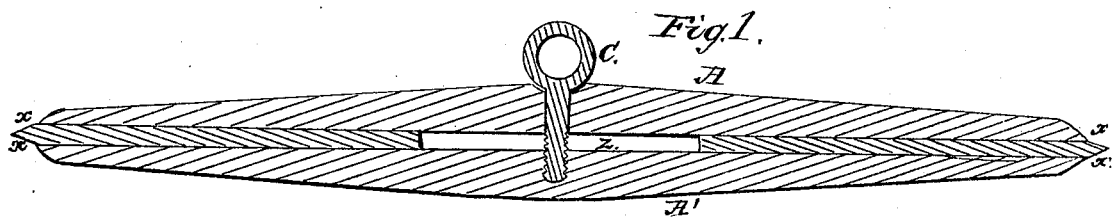
Figure 2:
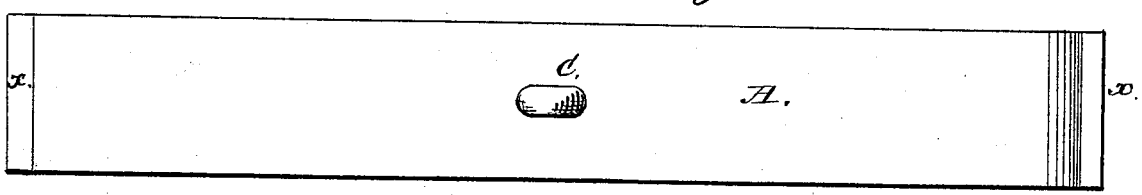

In the annexed drawings, making a part of this specification, A and A' represent two metallic bars, which form the head of the mill-pick. These bars are formed thick in the centre, and converge from thence to each end, as shown in Figure 1. Between these bars is placed the steel plate B, which is slightly longer than the bars A A', and sharpened at each end, $x$, for cutting the stone. At the centre of this plate is an oblong slot, through which is passed the set-screw C from the upper bar A, and extends down into the lower bar A'. It will be seen that this bar can be forced out more at either end, and there secured in its place by this screw between the bars A A'.

Having thus fully described my invention, what I claim as new, and desire to secure by Letters Patent, is—

The combination and arrangement of the bars A A', steel plate B, and set-screw C, when constructed and used for the purposes specified.

In testimony that I claim the foregoing I have hereunto set my hand and seal this 26th day of March, 1867.

WILLIAM B. STEPHENS. [L. S.]

Witnesses:
    MILO POLMATEER,
    B. W. STEPHENS.